United States Patent
Villegas et al.

(10) Patent No.: US 10,742,394 B2
(45) Date of Patent: Aug. 11, 2020

(54) KEY SEQUENCE GENERATION FOR CRYPTOGRAPHIC OPERATIONS

(71) Applicant: NAGRAVISION S.A., Cheseaux-sur-Lausanne (CH)

(72) Inventors: Karine Villegas, Cheseaux-sur-Lausanne (CH); Brecht Wyseur, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 108 days.

(21) Appl. No.: 15/772,933

(22) PCT Filed: Nov. 2, 2016

(86) PCT No.: PCT/EP2016/076436
§ 371 (c)(1),
(2) Date: May 2, 2018

(87) PCT Pub. No.: WO2017/076911
PCT Pub. Date: May 11, 2017

(65) Prior Publication Data
US 2018/0316490 A1    Nov. 1, 2018

(30) Foreign Application Priority Data
Nov. 6, 2015 (GB) .................... 1519612.4

(51) Int. Cl.
*H04L 9/28* (2006.01)
*H04L 9/06* (2006.01)

(52) U.S. Cl.
CPC ........ *H04L 9/0618* (2013.01); *H04L 2209/24* (2013.01)

(58) Field of Classification Search
None
See application file for complete search history.

(56) References Cited

U.S. PATENT DOCUMENTS

| 6,185,679 B1 | 2/2001 | Coppersmith et al. |
| 2008/0232597 A1* | 9/2008 | Mare .................... H04L 9/0618 380/278 |

(Continued)

FOREIGN PATENT DOCUMENTS

| EP | 2197144 A1 | 6/2010 |
| WO | 98/31122 A1 | 7/1998 |

OTHER PUBLICATIONS

International Search Report and Written Opinion for PCT/EP2016/076436 dated Jan. 27, 2017.

(Continued)

*Primary Examiner* — Brandon S Hoffman
(74) *Attorney, Agent, or Firm* — Oblon, McClelland, Maier & Neustadt, L.L.P.

(57) ABSTRACT

Methods, system and devices are provided that generate a sequence of sub-keys for cryptographic operations from a main key. The main key is operated on only once to generate the sub-keys of the sequence, with a transformation comprising one or more one-way functions. The respective bit values of the sub-keys of the sequence are set using respective bit values of the one or more one-way functions. Advantageously, deriving sub-key bits from respective output bits of one or more one-way functions removes or at least reduces correlations between the main key and the sub-keys, as well as between sub-keys, making it harder or even impossible to recover the main key or other sub-keys from a single sub-key, for example as found using a side-channel attack. At the same time, by using the main key only once (rather than using the main key each time a sub-key is generated), the vulnerability of the main key to a side-channel attack is reduced, because the opportunities for recovering physical information that could lead to the discovery of the main key are reduced. Specific embodiments use parallel or chained execution of sub-functions to gen- (Continued)

erate respective sub-keys. Other specific embodiments generate all sub-keys from a single one-way function in one go.

7 Claims, 10 Drawing Sheets

(56) References Cited

U.S. PATENT DOCUMENTS

2008/0304664 A1    12/2008   Suthaharan
2009/0158051 A1*    6/2009   Michiels ................ H04L 9/002
                                                    713/189
2009/0245510 A1    10/2009   Ciet et al.

OTHER PUBLICATIONS

Junod et al. "FOX: A New Family of Block Ciphers." Network and Parallel Computing: Lecture Notes in Computer Science. pp. 114-129. Aug. 9, 2004.

Rijmen et al. "The cipher SHARK." Network and Parallel Computing: Lecture Notes in Computer Science. pp. 99-111. Feb. 21, 1996.

* cited by examiner $F_{\{0 \to N-1\}} := F_0 \circ F_1 \circ \ldots \circ F_{N-2} \circ F_{N-1}$

KEY SEQUENCE GENERATION FOR CRYPTOGRAPHIC OPERATIONS

The present disclosure relates to the generation from a main key of a sequence of sub-keys for cryptographic operations. More specifically, although not exclusively, the present disclosure relates to a block cipher having a key schedule in accordance with the sequence and use of the block cipher for encryption and decryption of a message.

BACKGROUND

Cryptographic block ciphers, such as DES or AES, whether implemented in hardware or in software, can be the target of physical attacks. In such attacks, an attacker gathers information of various types during the operation of the block cipher. Types of information used in such attacks include:
- side-channel information that leaks from the execution of the block cipher, such as power consumption, timing information or magnetic radiation;
- information from differential or collision fault analysis;
- both of the above.

This information can be used by the attacker to uncover the secret key used during the execution of the block cipher.

Block ciphers operate on round keys, which are sub-keys that are derived from the secret or main key according to a key schedule, by an algorithm typically referred to as the key schedule. In general, side-channel or fault attacks lead to the recovery of a round key. Due to correlations between the main key and round keys inherent in the key schedule of block ciphers such as AES or DES, it is relatively easy to derive the secret key from a recovered round key.

An attacker can target the execution of the key schedule (in which case the attack is likely to be a template attack that models the signal obtained from the side-channel and its noise), the application of the block cipher in encryption or decryption, or both the key schedule and block cipher execution. In the current state of the art, the main key can be recovered from either operation using a single side channel attack or other attacks on a single sub-key. Examples of possible attacks include side channel analysis (CPA—Correlation Power Analysis, DPA—Differential Power Analysis), or DFA—Differential Fault Analysis of the encryption/decryption operation. For the key schedule algorithm, a template side-channel attack is an example of a feasible attack.

In one approach proposed in the literature (P. Junod and S. Vaudenay. FOX: a new family of block ciphers. Selected Areas in Cryptography 2004: Waterloo, Canada, Aug. 9-10, 2004. Lecture Notes in Computer Science. Springer-Verlag), the key schedule has been designed such that each round key is generated by applying a cryptographic, collision resistant and one-way function to the secret main key. In this way, correlations between round keys and between the round keys and the secret key are reduced or eliminated, so that an attack based on recovering a single round key using side-channel or fault analysis information is unlikely to succeed. While the use of a one-way function in this way to reduce correlations between keys is a step forward, further improvements in resilience to attacks, specifically side-channel or other physical attacks would be desirable.

SUMMARY

Some aspects of the disclosure are set out in the accompanying independent claims. Some optional features of specific embodiments are set out in the dependent claims dependent thereon.

In some embodiments, a sequence of sub-keys for cryptographic operations is generated from a main key, with each sub-key being defined by respective bit values. The main key is operated on only once to generate the sub-keys of the sequence, with a transformation, for example a sequence of operations comprising one or more one-way functions. The respective bit values of the sub-keys of the sequence are set using respective bit values of the one or more one-way functions. For example, in some embodiments, each bit of the output of the one or more one-way functions is used only once to set a corresponding bit value of all the bit values of the sub-keys. There is thus a one to one relationship between a bit value of the output of the one or more one-way functions and its corresponding bit value of the sub-keys.

Advantageously, deriving sub-key bits from respective output bits of one or more one-way functions removes or at least reduces correlations between the main key and the sub-keys, as well as between sub-keys, making it harder or even impossible to recover the main key or other sub-keys from a single sub-key, for example as found using a side-channel attack. At the same time, by using the main key only once (rather than using the main key each time a sub-key is generated), the vulnerability of the main key to a side-channel attack is reduced, because the opportunities for recovering physical information that could lead to the discovery of the main key are reduced.

In the context of cryptographic operations, a one-way function will be understood to be a function that is easy to compute to generate an output from an input (for example in the sense that the computational complexity is polynomial in time and space, or more practically, within a certain number of machine operations or time units—seconds or milliseconds) and which is practically non-invertible meaning that is not realistic to find or reconstruct the input from the output (in the sense that the computational complexity might involve super polynomial effort, exceeding accessible resources). This is often referred to as pre-image resistance. Also, in this context, the output bits of a one-way function will be independent of each other in the sense that there is no information in the state of one bit regarding the state of other bits of the output.

It is further typically preferable, but not mandatory, that a one-way function in this context also has the properties of second pre-image resistance and collision resistance.

In particular, one or more of the following one-way functions (combinations of one-way functions) may be used in accordance with various embodiments. This includes, but is not limited to:
- Cryptographic hashes, such as SHA-1, SHA-256, RIPEMD-160, SHA-3, etc.;
- Special-purpose one-way functions with larger outputs, for example the Rabin function $x^2$ mod N with N being the product of two large prime numbers, or higher order versions of this function;
- Lightweight pseudo hash functions to decrease computational resource requirements, such as xxhash or SipHash;
- a Davis-Meyer construction based on a, preferably lightweight, permutation (a lightweight permutation are capable of being run on devices with very low computing power;
- a product with a non-invertible matrix;
- use of discrete Logarithm problem: $a^x$ mod p, with p a prime, a a generator of $Zp^*$, and x the input of the one-way function In embodiments where more than one one-way computation is required, the respective one-way functions used may be the same, or may be different from each other.

In some embodiments, the respective bit values of at least two of the sub-keys are set in accordance with respective bit values of one one-way function, according to a predefined relationship. In this way, two or more sub-keys can be generated by computation of a single one-way function. In one particular case, the respective bit values of all the sub-keys of the sequence are set in accordance with respective bit values of one one-way function. In this case, all sub-keys are generated by a single one-way function, requiring only a single use of the main key and ensuring that the main key is protected by the one-way characteristics of the one-way function and that sub-key bits and hence sub-keys are independent of each other due to the independence of the output bits of the one-way function.

In some embodiments, operating on the main key generates a plurality of intermediate outputs using respective sub-functions. A one-way function applied to each intermediate output then generates a respective one-way output and one or more of the sub-keys are generated from each one-way output. By generating a plurality of intermediate outputs using the main key only once, and then using respective one-way functions to generate the sub-keys, one-way functions that produce fewer bits than are needed to generate all sub-keys can be used to generate the sub-keys while still only using the main key once.

In some embodiments, the intermediate outputs are generated by first applying a first sub-function to the main key to generate a first intermediate output followed by repeatedly applying a next sub-function to the previous intermediate output to generate a next intermediate output. Respective one-way functions are applied to each intermediate output to generate corresponding one or more of the sub-keys of the sequence. In this way the sub-keys of the sequence can be generated. The processing from sub-function to the corresponding one or more sub-keys may be done synchronously (computing a sub-function and the corresponding sub-key(s), then computing the next sub-function and corresponding sub-key(s), and so on). Alternatively, all sub-functions may first be processed, storing the outputs (of the sub-function and/or the one-way function), and the sub-keys may subsequently be generated from the stored values.

Instead of passing the intermediate outputs through respective one-way functions, in some embodiments all intermediate outputs are passed through a single one-way function (or even a single instance of the same one-way function), that is the first and the next one-way functions are the same function. Independently, the sub-functions may be mutually different or may all be the same, for example a bit operator such as a shift or rotation operator. Since each application of the sub-functions is cumulative in the sequence, the inputs to the one-way function(s) will vary with the sequence of repeated applications of the same function and hence produce a sequence of varying sub-keys. Since the intermediate outputs are passed through a one-way function to generate the sub-keys of the sequence, even for simple and possibly even repeating operations to generate the intermediate outputs, it will be at least as difficult to infer the main key or other sub-keys from one recovered sub-key as it is difficult to invert the one-way function(s). At the same time, since the main key is only used once to generate the first intermediate output, it is less prone to be discovered in a side-channel attack or other physical attack. In addition, in some embodiments, the main key can further be dissociated from the generated sub-keys by passing it through a one-way function and passing the result to the first sub-function, thereby increasing the difficulty of recovering the main key from a cryptanalysis starting from a sub-key uncovered using side-channel information.

In some embodiments, where the sub-functions are cumulative in the sense that the corresponding chain of operations can be captured in a single composite function and are also invertible, this can be exploited to generate a reverse sequence of sub-keys. For example the reverse sequence may be used as a decryption sequence of sub-keys that is the reverse of an encryption sequence of sub-keys, to decrypt a message encrypted with a block cipher having a key schedule generating the encryption sequence of sub-keys. For the avoidance of doubt an unencrypted message string is referred to here as a plaintext or plaintext message without any implication as to the content of the message being text but "text" rather referring to any string of symbols, alphanumeric or otherwise. Likewise, the term ciphertext or ciphertext message is to be understood accordingly as an encrypted version of the message.

In some embodiments for generating a reverse sequence of a sequence of sub-keys generated using a sequence of sub-functions that are invertible and have a composite function providing as an output the last intermediate output in the generation of the forward sequence of sub-functions, the same process as above is followed with the first sub-function being the composite function and the next sub-functions being the respective inverse functions of the next sub-functions of the forward sequence, in reverse order. While the forward sequence has been described above as an encryption sequence and the reverse sequence as a decryption sequence, it will be appreciated that the roles can be swapped and that the efficient generation of corresponding forward and reverse sequences of sub-keys may find wider application.

In some embodiments sub-functions used in the generation of sub-keys are not executed in a chained sequence as described above, each subsequent sub-function taking the output of the previous sub-function as an input, but rather the sub-functions are executed independently, for example asynchronously or in parallel. This means that each sub-function needs to be supplied with its input independently. In order to avoid using the main key more than once in these embodiments, the main key is passed once through a further one-way function, for example a one-way function as discussed above, and the result is then supplied to each of the sub-functions, thus avoiding multiple reads of the main key. The sub-keys are then generated from the output of the sub-functions via respective one-way functions or a shared one-way function, as described above.

One or more of the following sub-functions (combinations of sub-functions) may be used in accordance with various embodiments, including but not limited to:
 affine functions (by definition invertible)
 invertible Boolean functions
 invertible Bit or Byte operators, such as XOR/ADD with constant, Shift/rotation, XOR/ADD of different bits of the state, bit permutations.
 an invertible table lookup function
 an invertible exponentiation function
 a Feistel construction
 a combination of the above The sub-functions may comprise one or more of the above classes of functions. Specifically, the sub-functions may comprise functions of the same one of the above classes or the same function varying in its parameters. As described above, the sub-functions may be the identical and/or a single sub-function used repeatedly, in some embodiments. Any one of the above sub-functions may be combined with any one of the above one-way functions in accordance with various embodiments. In some embodiments, the sub-function(s) are invertible table-lookup functions and the one-way function(s) are Davis-Meyer constructions based on a lightweight permutation. While it is desirable for the sub-functions to be invertible to enable certain of the above embodiments that require the sub-functions to be inverted, this is not necessary in all embodiments.

As mentioned above, the one-way functions may be the same or some or all of the one-way functions may be mutually different. The same one-way function may be implemented, for example in hardware, in a single instance and may take inputs from the sub-functions in sequence to produce the corresponding sequence of sub-keys. Therefore, it will be understood that reference to one-way function in the plural includes the singular in that all one-way functions may be the same single one-way function and may be implemented as a single logical or physical instance of that single one-way function.

Aspects of the disclosure include a block cipher with a key schedule defined by a sequence of sub-keys (a sequence of generating sub-keys) as described above, and the use of such a block cipher for encryption and decryption of messages.

Further aspects of the disclosure include systems having means for implementing processing steps to generate sequences of sub-keys and/or process (encrypt/decrypt) messages as described above; computer program products and signals encoding in physical form coded instructions that, when executed on a processor, implement processing steps as described above; and one or more tangible recordable media or memory devices, for example optical or magnetic discs or solid state devices, storing coded instructions that, when executed on a processor implement processing steps as described above. Further, these aspects extend to the combination of such computer program products and signals, tangible recordable media and memory devices in combination with a processor for executing the instructions, for example in a general purpose computer.

Yet further aspects of the disclosure include a device comprising a memory for storing the main key and at least one sub-key; and a processor configured to implement processing steps as described above to generate sequences of sub-keys and/or process (encrypt/decrypt) messages as described above. Embodiments of such a device comprise Application Specific Integrated Circuits, Field Programmable Gate Arrays, System On Chip and Integrated Circuit devices, or combinations thereof. It will be understood that in aspects in which processing comprises both encryption and decryption, encryption and decryption may be done in the same device or each may be done in a separate device with messages passed between the separate devices.

BRIEF DESCRIPTION OF THE DRAWINGS

Specific embodiments will now be described, by way of example, to illustrate aspects of the disclosure and with reference to the accompanying drawings, in which.

DETAILED DESCRIPTION OF SPECIFIC EMBODIMENTS

Figure 1:
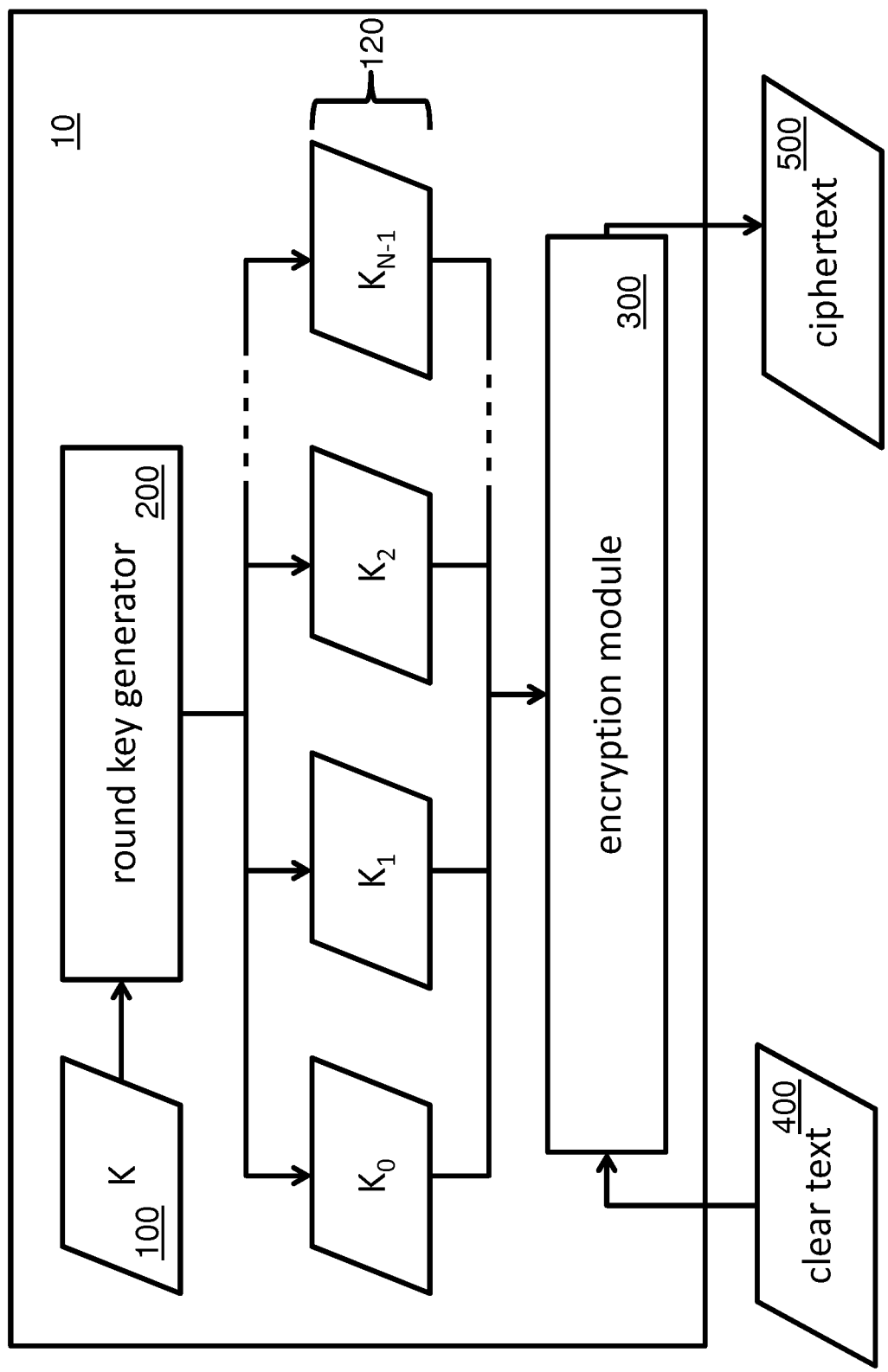
FIGS. 1 to 4 illustrate different modes of a block cipher with a round key generator.
Figure 2:
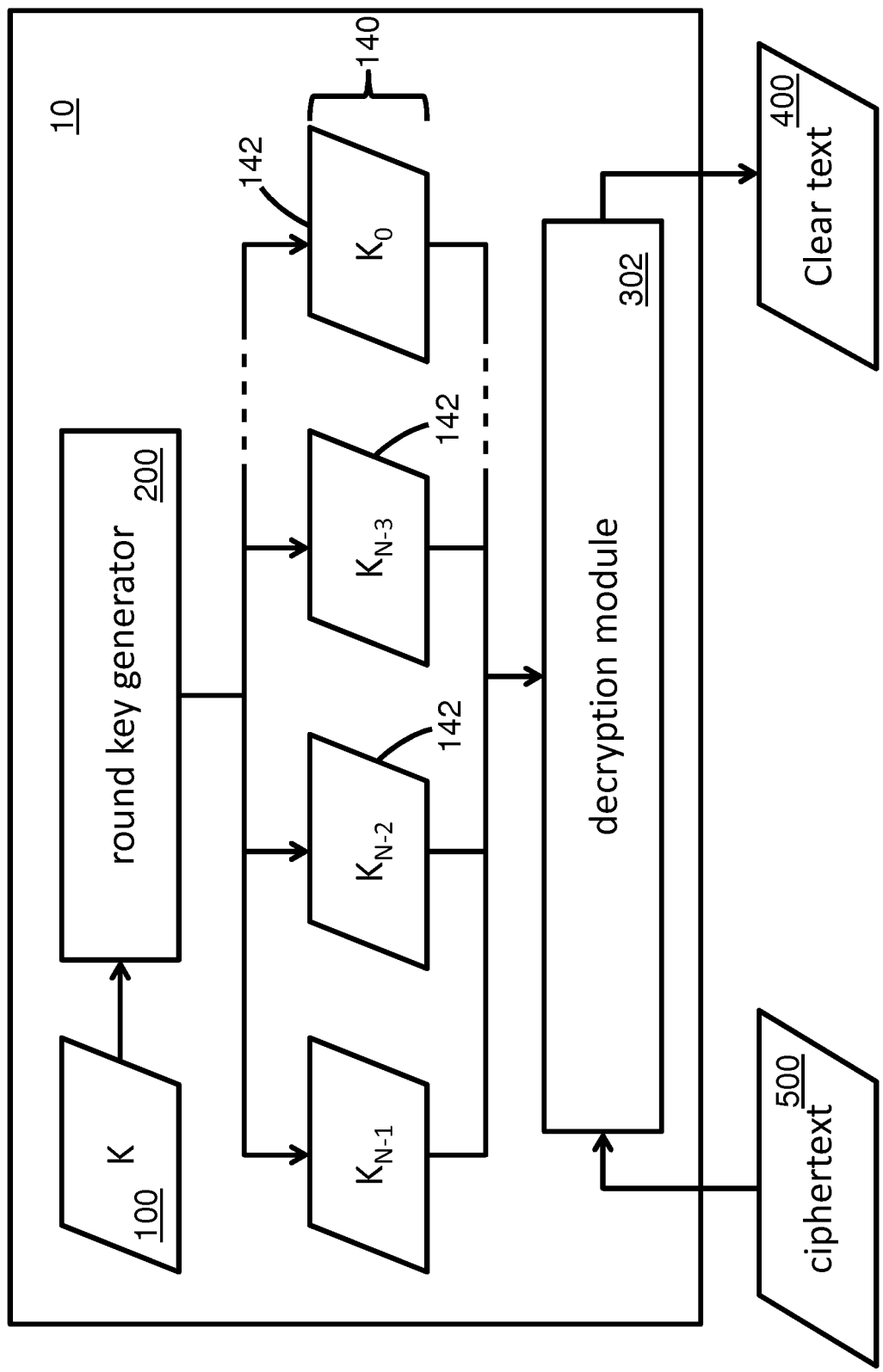

With reference to FIGS. 1 to 4, a block cipher 10 comprises a round key generator 200 taking as input a main key K stored in a register 100. The round key generator 200 generates a sequence 120 of round keys $K_0, K_1, K_2, \ldots, K_{N-1}$. An encryption module 300 takes as input the sequence of round keys 120 and a plaintext from a register 400. The encryption module 300 encrypt the plaintext 400 with the first key in the sequence, then encrypts the result with the second key in the sequence, and so on for all keys in the sequence, and outputs a cipher text to a register 500 as a result. With reference to FIG. 2, in a decryption mode of the block cipher 10, the encryption module 300 is replaced with a decryption module 302 taking as an input a cipher text from the register 500 and a decryption sequence 142 that is the reverse of the encryption sequence 140 of round keys 142. The decryption module 302 decrypts the cipher text 500 by applying the first key of the sequence 140 (the last key of the sequence 120) to the cipher text 500, then the second key 142 in the sequence 140 to the result of that operation, and so forth, until the last key in the sequence 140 is used to produce the plaintext 400. It will be understood that, according to the embodiment, encryption and decryption modules of the block cipher 10 are implemented in the same device or circuit (in some embodiments sharing computational modules) or in different devices and circuits.

Figure 3:
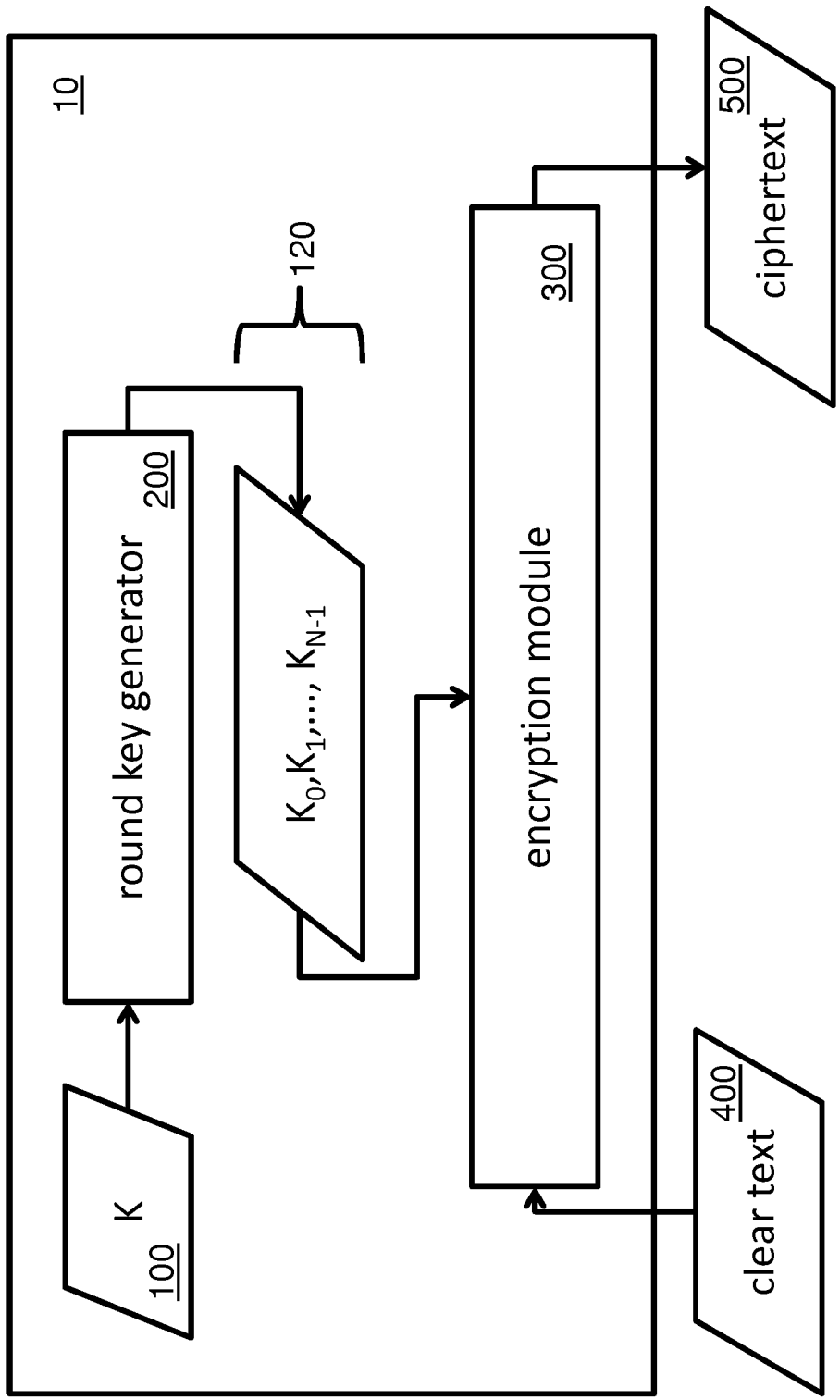
Figure 4:
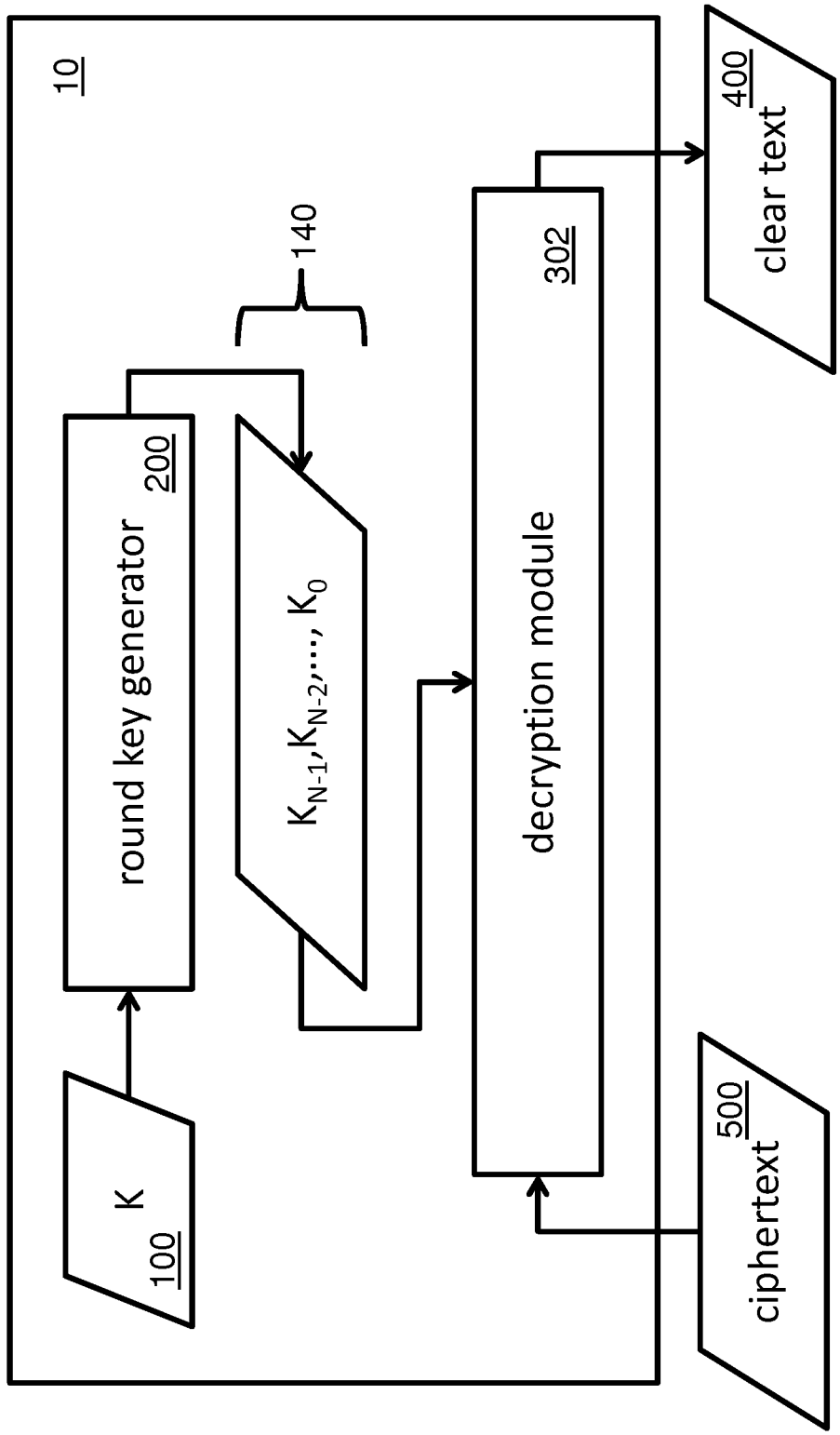

In some embodiments, as illustrated schematically in FIGS. 1 and 2, the round keys are generated independently, that is each round key is stored separately to store the entire sequence 120, 140 of round keys, enabling the round keys of the sequence to be generated in any order or in parallel (and the decryption sequence to be generated by reading the encryption sequence in reverse order without further computation). In other embodiments, as schematically illustrated in FIGS. 3 and 4, the round keys are generated in sequence one at a time. While this is advantageous in requiring less memory to store the round keys and exposing only one round key at a time, it requires that the reverse sequence of round keys is computed again, while in embodiments as depicted in FIGS. 1 and 2, the stored round keys can simply be traversed in the reverse order.

Figure 5:
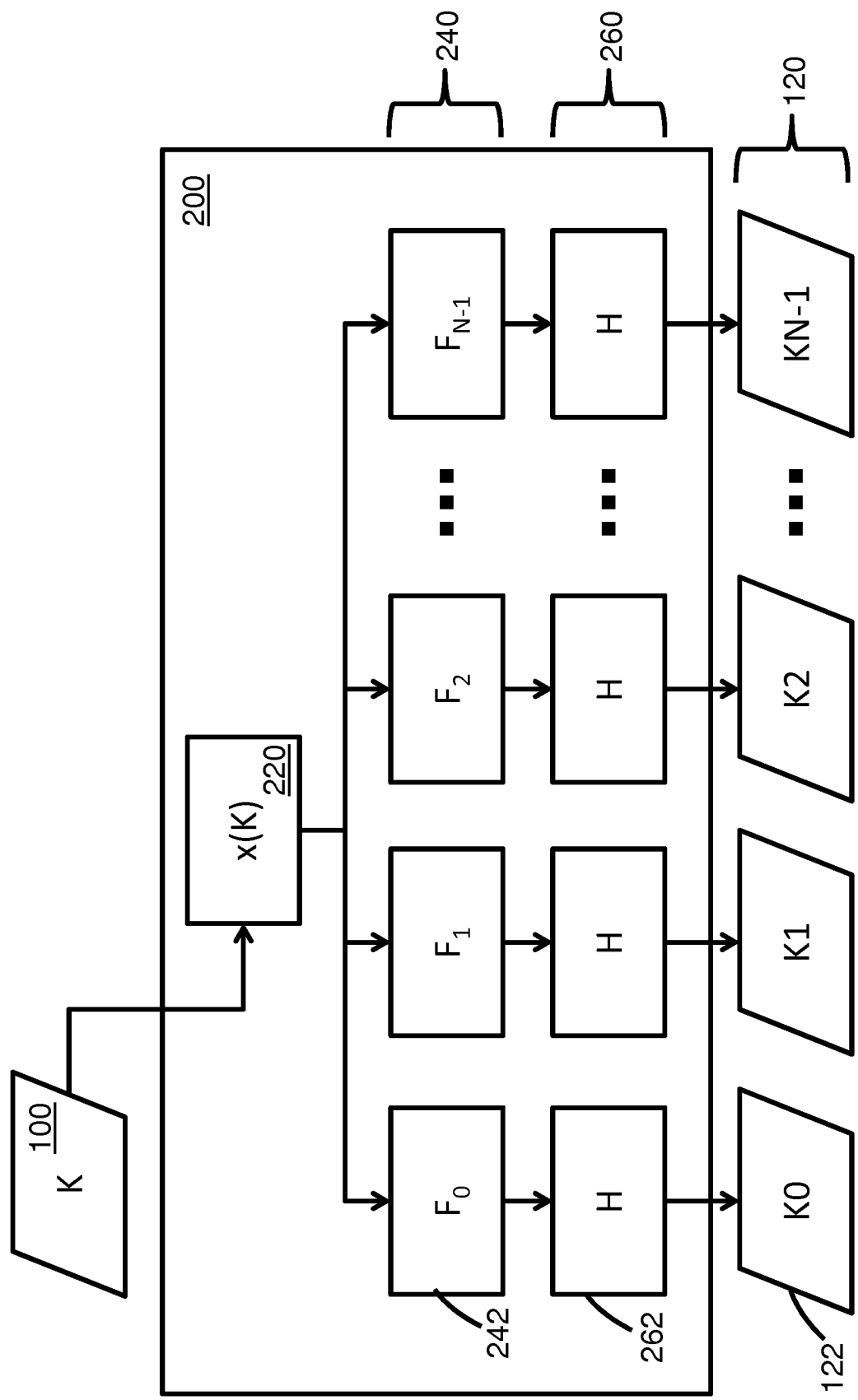
FIG. 5 illustrates an implementation of a round key generator enabling parallel execution of sub-functions to generate round keys.

With reference to FIG. 5, a specific embodiment of the round key generator 200 is now described. The main key K is passed through a one-way function 220, also referred to as x, and the result is then passed through a set 240 of sub-functions 242, also referred to as $F_0, F_1, F_2, \ldots, F_{N-1}$. The result of each sub-function 242 is then passed through a sub-function 262, also referred to as H. The result of each sub-function 242 may be fed to a common one-way function 262 common to all sub-functions, or each sub-function 242 may have a corresponding one-way function 262 to form a set of instances of one-way functions 260, which may all implement the same one-way function H, or different one-way functions, for example a different one-way function 262 for each sub-function 242. These operations result in a set of round keys 122 as the output of the one or more one-way functions 262, in a sequence 120 of sub-keys 122, also referred to as $K_0, K_1, K_2, \ldots, K_{N-1}$.

Taking the sequence 120 as an encryption sequence, the decryption sequence can be obtained simply by reading the sequence 120 in reverse order in embodiments where the round keys 122 are all stored. In other embodiments, the decryption sequence can be obtained by generating the reverse sequence of round keys by running the sub-functions 242 in reverse order to the sequence 240, for example where only one round key is stored and generated on the fly.

In some embodiments, irrespective of whether the round keys 122 are computed in one go or on the fly, the following functions are used for x, F and H, where p, q, p*, q*, pi and qi are large prime numbers:

$$x := K^2 \bmod N^*, \text{ with } N^* = p^* \cdot q^*$$

$$Fi(x) := x^2 \bmod Ni, \text{ with } Ni = pi \cdot qi$$

$$H(y) := y^8 \bmod N, \text{ with } N = p \cdot q; y := Fi(x)$$

The prime numbers for p* and q*, are chosen such that it is in practice not possible to compute the square root. For example, in some embodiments $\log_2(|N^*|)$ is at least 2048 bits. The others primes pi and qi are chosen similarly, for example such that $\log_2(|Ni|)$ is half the number of bits of the output of x (half of $\log_2(|N^*|)$) and p and q are chosen such that $\log_2(|N|)$ is greater or equal the number of bits required in the round keys 122. To protect the main key K from side-channel analysis, a random multiple of N* can be added to K on read out, or K can be stored with such a constant added, as, in embodiments using a mod N* operation as a first stage, this will not affect the output of x.

Figure 6:
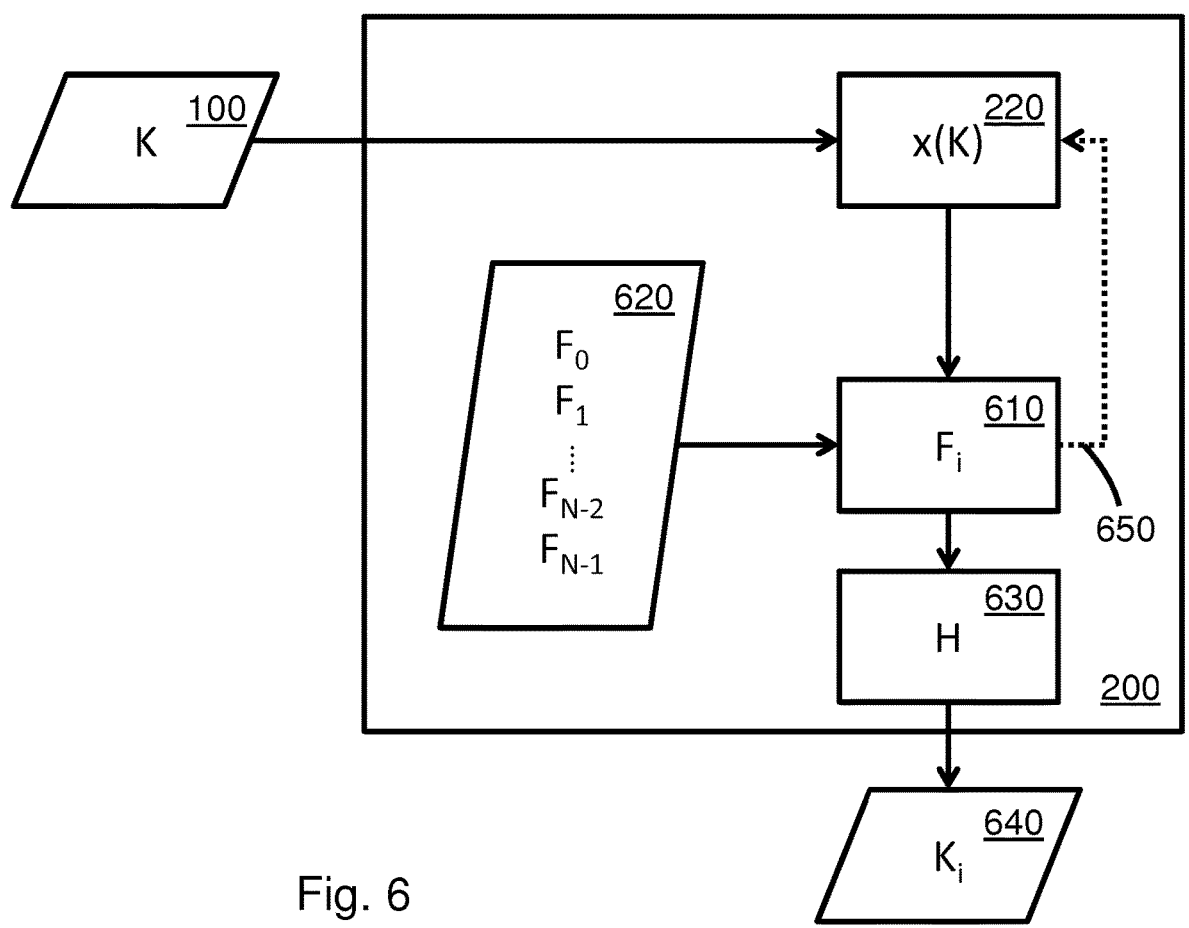
FIG. 6 illustrates a recursive version of the implementation of FIG. 5.

With reference to FIG. 6, some embodiments in which only a single round key Ki is stored in a register 640 and generated on the fly to generate the sequence 120 is now described. Such embodiments are particularly suitable for implementation in dedicated circuits in which execution can be done quickly in hardware and storage capacity may be limited. A register 100 holding a value for the main key K is read by a module 220 implementing x. The module 220 calculates x(K) and stores it in internal register. A sub-function module 610 configured to compute a sub-function $F_i$ for each iteration of key generation communicates with a register 620 holding a sequence of parameters, each defining a specific instance of $F_i$ for each iteration: $F_0, F_1, \ldots F_{N-2}, F_{N-1}$. The sub-function module 610 passes its output to a one-way module 630 implementing the one-way function H to generate an output $K_i$ and store it in a register 640. The sub-function module 610 is configured such that it sends a trigger on a trigger connection 652 to module 220 to receive the value of x(K) again (alternatively this value may be stored in a register in sub-function module 610 or elsewhere). On receiving the value of x(K), the next parameter to define $F_{i+1}$ is read from the register 620 and a value for $K_{i+1}$ is calculated via one-way module 630.

Figure 7:
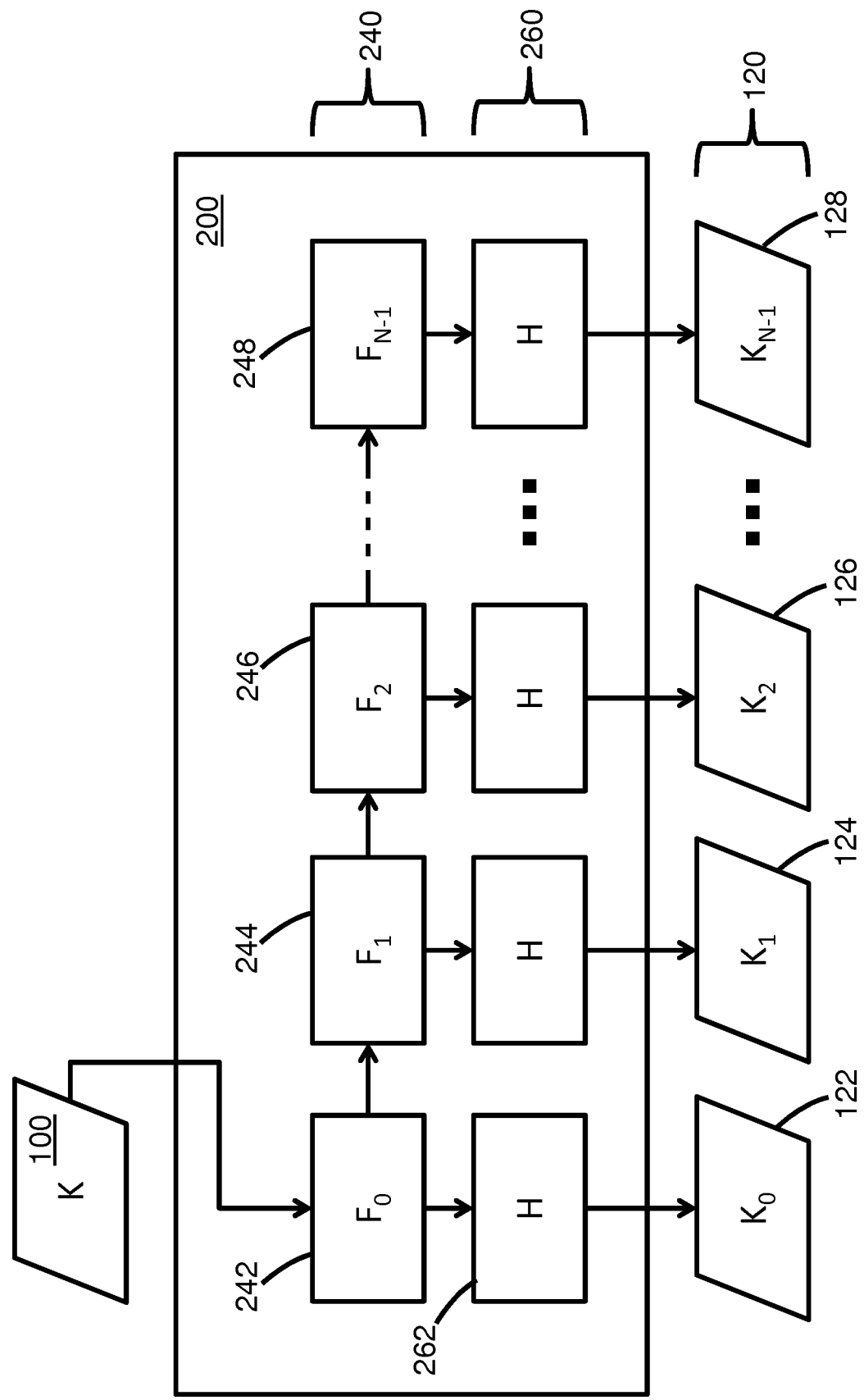
FIG. 7 illustrates an implementation of a round key generator with sequential execution of sub-functions.

Embodiments described so far protect the main key by passing it through a first one-way function x and calculate the round keys 122 from this value as independent inputs to respective sub-functions 242. Alternative embodiments are now described with reference to FIGS. 7 to 9, in which a first sub-function 242 of the sequence of sub-functions 240 takes the main key K as an input and subsequent sub-functions $F_1$, $F_2, \ldots, F_{N-1}$ 244 to 248 ($F_1, F_2, \ldots, F_{N-1}$) each take the output of the previous sub-function as an input, for example the sub-function 244 takes as input the output of the sub-function 242, and the sub-function 246 takes as input the output of the sub-function 244, and so on. The output of each sub-function 242 to 248 in the sequence 240 is again passed through a one-way function 262, as discussed above with reference to FIG. 5 to produce in turn as an output a sequence 120 of round keys 122 to 128, again as described above with reference to FIG. 5.

In some specific embodiments, $F_i$ is chosen from the classes of functions described above specifically in some embodiments $F_i$: is a table look up function, and the one-way function H(y) is chosen from the classes of functions described above, specifically in some embodiments, H(y) is a Davis-Meyer construction based on a lightweight permutation. In some embodiments, the one-way function H may be chosen as above, that is $H(y) := y^8 \bmod N$. In some embodiments, a first one-way function x, as described above, may be interposed between K and the first sub-function 242 ($F_0$) of the sequence 240.

Taking the sequence of round keys 120 as the encryption sequence, the decryption sequence can be derived simply by reading the sequence 120 in reverse, in embodiments in which the individual round keys 122 to 128 remain stored. Where the round keys 122 to 128 are not available, they can of course be computed by the sequence of sub-functions 240, as described above, with results read in reverse order once computed. However, it may be desirable to begin the computation of the decryption sequence with the first round key of the decryption sequence, which is the last round key of the encryption sequence. This means that the first key to be used is available first, and enables embodiments in which round keys are computed on the fly and not stored. Some embodiments enabling the reversal of the sequence of round keys to derive a decryption sequence 130 of round keys 122 to 128 are now described with reference to FIG. 8. These embodiments are suitable for computing the reverse or decryption sequence 134 of a forward or decryption sequence 120 derived using sub-functions 242 to 248, which are invertible and from which a composite function that directly computes the result of the sequence of sub-functions 240 can be constructed as a composite function of the sub-functions 242 to 248 as follows:

$$F_{\{0 \to N-1\}} := F_0 \circ F_1 \circ \ldots \circ F_{N-2} \circ F_{N-1}$$

Figure 8:
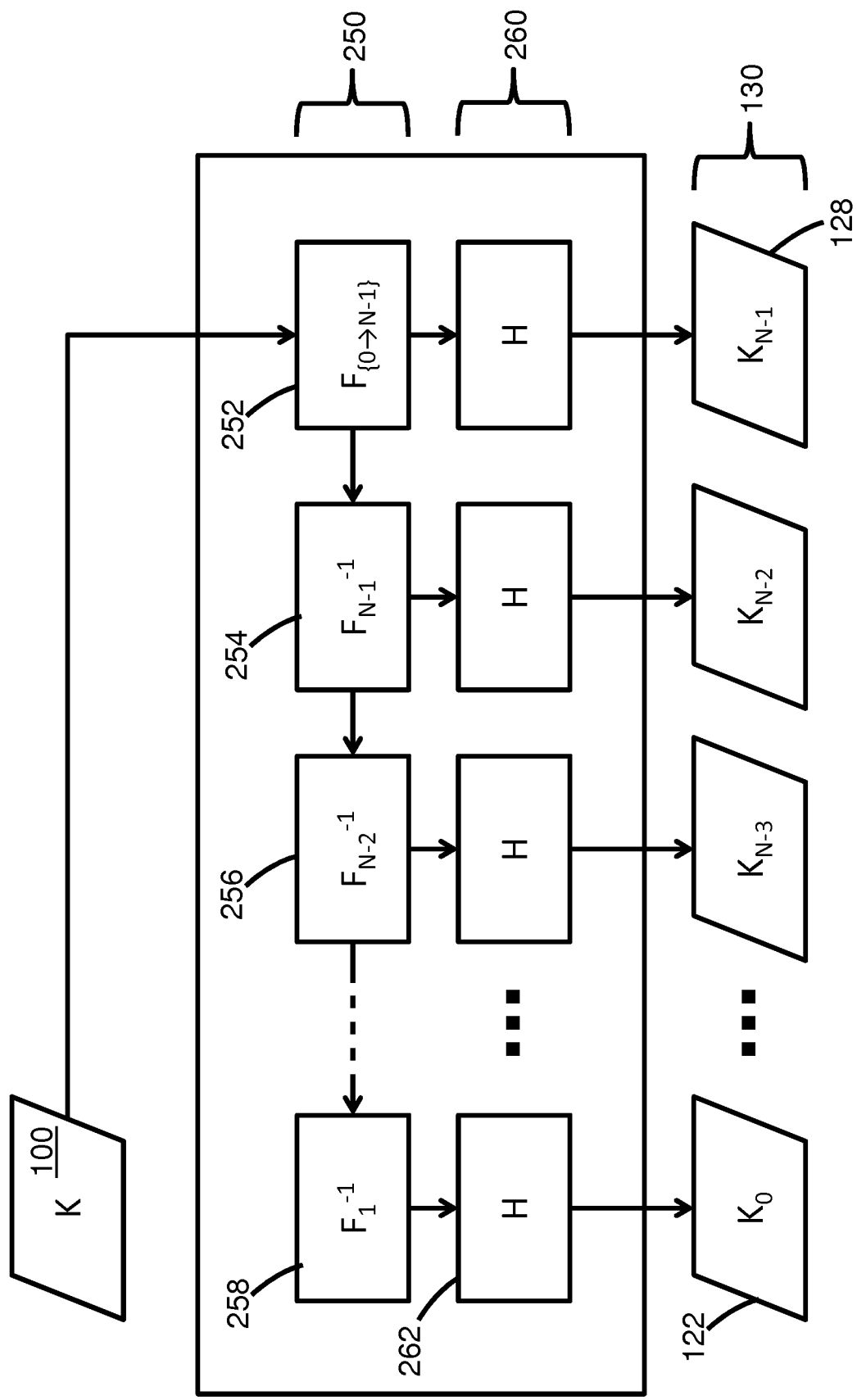
FIG. 8 illustrates an implementation of a round key generator with sequential execution of sub-functions to generate a reverse sequence of round keys.

With reference to FIG. 8, a first sub-function 252 of the reverse sequence 250 computes the composite function $F_{\{0 \to N-1\}}$ of the sub-functions of the forward sequence 240 and the output is passed through a one-way function 262 to generate a first round key 128 in the reverse round key sequence 130, corresponding to the last round key 128 of the forward sequence 120, that is $K_{N-1}$. The output of the sub-function 252 is also passed to the next sub-function 254 of the reverse sequence 250, which corresponds to the inverse function of the last function 248 of the forward sequence 240, $F_{N-1}^{-1}$. The output of the sub-function 254 is again passed through a one-way function 262 to generate the next round key in the reverse sequence 130, $K_{N-2}$, the penultimate round key in the forward sequence 120. The next sub-function 256 in the reverse sequence 250 corresponds to the inverse of the penultimate sub-function in the forward sequence 240, $F_{N-2}^{-1}$, and is used to generate the next round key in the inverse sequence 130, and so forth, until the last sub-function in the reverse sequence 250 which corresponds to the inverse of the second sub-function in the forward sequence 240 is used to generate the last round key 122 in the reverse sequence 130, which is the first round key in the forward sequence 120.

As mentioned above, in these embodiments, the sub-functions are required to be invertible and composable into a composite function. In some embodiments, the sub-functions are invertible table lookup functions or shift or rotation bit operators. As long as the sub-functions are invertible and composable, the sub-functions of the sequence 240 may be all the same, single sub-function, used repeatedly, or may each be different, or a combination of the two.

Figure 9:
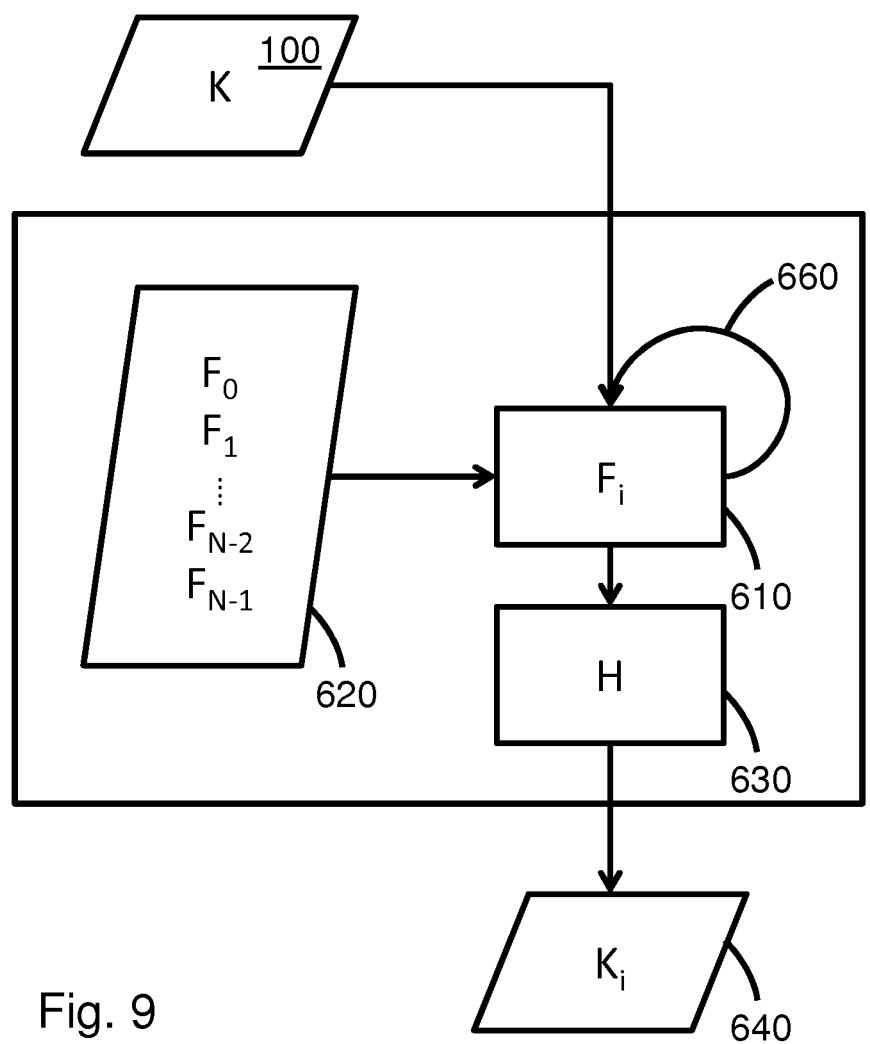
FIG. 9 illustrates a recursive version of the implementations of FIGS. 7 and 8.

With reference to FIG. 9, some embodiments in which only a single round key $K_i$ is stored in a register 640 and round keys are generated on the fly to generate the sequence 120 using a sequence of sub-functions 240 is now described. It will be understood that these embodiments are equally suitable for producing the sequence 130 described above using the corresponding sequence 250 of sub-functions. Again, such embodiments are particularly suitable for implementation in dedicated circuits in which execution can be done quickly in hardware and storage capacity may be limited.

A register 100 holding a value for the main key K is read by a sub-function module 610. As described above, the sub-function module 610 also reads one or more parameters to define the function $F_i$ for the relevant iteration and evaluates Fi, supplying the result as an output to a one-way module 630 which calculates a one-way function of its input and stores the result as the round key $K_i$ in register 640. The module 610 also supplies its own output again to its input over a line 660 trigger the calculation of the next sub-function $F_{i+1}$ and hence $K_{i+1}$ via the one-way function module 630.

All of the above embodiments have been described in terms of generating a single round key $K_i$ from a corresponding sub-function $F_i$. In these embodiments, the number of bits in the output of the one-way function(s) H must be equal to or greater than the number of bits of the round $K_i$. It will, of course, be understood that in some embodiments the output of the one-way functions may have less bits than required for the sub-keys. In such embodiments, for example where the number of output bits of the one-way function is ½ the number of bits required, or 1/m more generally, the processes above can be run twice or m times to generate the required bits. Likewise, in some embodiments, the output of two (m) one-way functions run one after the other can be combined to generate the sub-keys in sequence, in effect grouping adjacent round keys (as illustrated in the figures) together to form a round key of sufficient bits.

On the other hand, in some embodiments, the number of bits in the output of H is at least m-fold that of a single round key $K_i$ and m round keys are generated from the output of the one-way function H applied to a corresponding sub-function $F_i$. In other words, in these embodiments, m round keys $K_{i \cdot m+j}$, j=1, 2, . . . , m, are generated from each sub-function $F_i$. For example, if the output of H has 2048 bits, 16 128 bit round keys $K_i$ can be generated from the output of that function.

In some embodiments, the output bits of H are mapped to the bits of the $K_i$ by a predetermined relationship. For example, if the number of bits of $K_i$ is n, the first n bits of the output of H are used to set the bits of $K_0$, the next n bits of the output of H are used to set the bits of $K_1$, and so forth. Other relationships are of course equally possible, for example using the first m bits of the output of H to set the first bits of all $K_j$, using the second m bits of the output of H to set the second bits of $K_j$, and so forth, or any other predetermined mapping.

Figure 10:
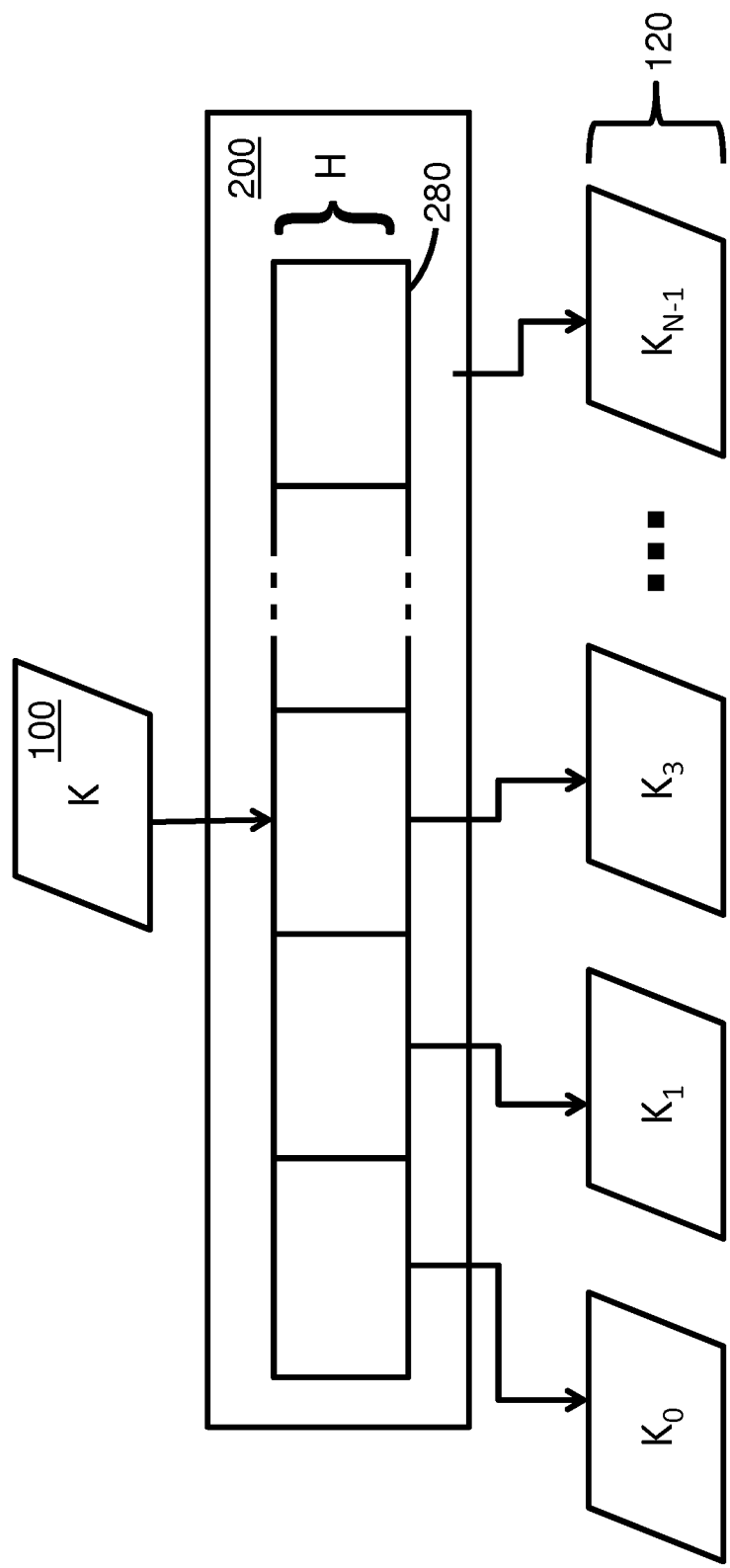
FIG. 10 illustrates an implementation of a round key generator generating a sequence of round keys using a single one-way function.

In some embodiments, now described with reference to FIG. 10, a single one-way function 280 produces an output with a sufficient number of bits to generate the required number of round keys $K_i$ in the sequence 120, that is there are m round keys in the sequence in terms of the above discussion. Since all round keys are generated from the output of a single one-way function, no sub-functions $F_i$ are required or, alternatively, the one-way function 280 can be seen as the combination of a single sub-function $F_i$ and a one-way function H. As illustrated in FIG. 10 and described above, in some embodiments the bits of contiguous blocks of the output of the one-way function 280 are used to define corresponding $K_i$ round keys, although other schemes of assigning one-way function output bits to round key bits are equally possible, as described above.

While the preceding specific description made reference to some specific functions to implement x, H and $F_i$, many other suitable functions are possible subject to the constraints explained above, where applicable, in the various embodiments, and will readily occur to a person skilled in the art. Specifically, some suitable functions have been discussed above and may be used in combination with the described specific embodiments.

The following embodiments are also disclosed:

1. A device for generating from a main key a sequence of sub-keys for cryptographic operations, wherein each sub-key is defined by respective bit values, the device comprising a memory for storing the main and at least one sub-key and a processor configured to:
   operate on the main key with a transformation, wherein the transformation comprises one or more one-way functions and the main key is operated on only once to generate the sub-keys of the sequence; and
   set the respective bit values of the sub-keys of the sequence using respective bit values of the one or more one-way functions.

2. A device according to item 1, wherein setting the respective bit values comprises setting the respective bit values of at least two of the sub-keys in accordance with respective bit values of one of the one or more one-way functions according to a pre-defined relationship.

3. A device according to item 1, wherein setting the respective bit values comprises setting the respective bit values of all the sub-keys of the sequence in accordance with respective bit values of the one of the one or more one-way function according to a pre-defined relationship.

4. A device according to item 1 or 2, wherein operating on the main key comprises generating a plurality of intermediate outputs and applying a one-way function to each intermediate output to generate a respective one-way output, and wherein the processor is configured to generate one or more of the sub-keys from each one-way output.

5. A device according to item 1, 2 or 4, wherein the processor is configured to
   apply a first sub-function to the main key to generate a first intermediate output;
   apply a first one-way function to the first intermediate output; and
   generate a first one or more of the sub-keys of the sequence from an output of the first one-way function, and
   repeatedly:
      apply a next sub-function to the previous intermediate output to generate a next intermediate output;

apply a next one-way function to the next intermediate output; and generate a next one or more of the sub-keys of the sequence from an output of the next one-way function.

6. A device according to item 1, 2 or 4, wherein the processor is configured to:

apply an input one-way function to the main key to generate a working key;

apply a plurality of sub-functions to the working key to generate respective intermediate outputs;

apply an output one-way function to each intermediate output to generate a respective transformation output; and generate the sub-keys of the sequence from the transformation outputs.

7. A device according to any one of items 1 to 6, wherein the processor is configured to implement a block cipher with a key schedule defined by the sequence and to use the sub-keys of the sequence as round keys in the block cipher.

8. A device for generating from a main key related forward and reverse sequences of sub-keys for use in cryptographic operations, the device comprising a memory for storing the main key and at least one sub-key and a processor configured according to item 5 to generate sub-keys of the forward sequence, wherein the next sub-functions are applied in a forward next sub-function sequence and wherein the first sub-function followed by the sub-functions of the forward next sub-function sequence define a forward sub-function sequence;

and wherein the processor is configured according to item 5 to generate from the main key a reverse sequence of sub-keys, wherein the first sub-function is the composite function of the sub-functions of the forward sub-function sequence and wherein the next sub-functions are applied in a reverse next sub-function sequence and the sub-functions of the reverse next sub-function sequence correspond to the respective inverse functions of the sub-functions of the forward next sub-functions sequence in reverse order.

9. A device for decrypting a message encrypted with a block cipher, the block cipher having a key schedule comprising round keys applied in an encryption sequence, the encryption sequence of round keys being obtainable from a main key by a processor configured in accordance with item 5, wherein the next sub-functions are applied in an encryption next sub-function sequence and the first sub-function followed by the sub-functions of the encryption next sub-function sequence define an encryption sub-function sequence, the device comprising a memory for storing a main key and at least one sub-key and a processor configured in accordance with item 5 to generate from the main key a decryption sequence of sub-keys, wherein the first sub-function is the composite function of the sub-functions of the encryption sub-function sequence and wherein the next sub-functions are applied in a decryption next sub-function sequence and the sub-functions of the decryption next sub-function sequence correspond to the respective inverse functions of the sub-functions of the encryption next sub-functions sequence in reverse order; and configured to apply the sub-keys in the order of the decryption sequence to decrypt the message.

10. A device for processing a message with a block cipher having a key schedule, the device comprising a memory for storing a main key and at least one sub-key and a processor configured to:

encrypt a plaintext of the message with the block cipher to generate a cipher text, wherein the processor is configured in accordance with item 5 to generate round keys of the key schedule in an encryption sequence from a main key, wherein the next sub-functions are applied in an encryption next sub-function sequence and the first sub-function followed by the sub-functions of the encryption next sub-function sequence define an encryption sub-function sequence and wherein the processor is configured to encrypt the plaintext with a first one of the round keys in the encryption sequence to generate a first round text; and for the remaining round keys in the encryption sequence, encrypt a previous round text with a next round key in the encryption sequence to generate a next round text, wherein the last round text is the cipher text; and wherein the processor is further configured to decrypt the cipher text to generate the plaintext, wherein the processor is configured in accordance with item 5 to generate from the main key a decryption sequence of sub-keys, wherein the first sub-function is the composite function of the sub-functions of the encryption sub-function sequence, and wherein the next sub-functions are applied in a decryption next sub-function sequence and the sub-functions of the decryption next sub-function sequence correspond to the respective inverse functions of the sub-functions of the encryption next sub-functions sequence in reverse order; and wherein the processor is configured to decrypt the cipher text with a first one of the round keys in the decryption sequence to generate a first round text; and for the remaining round keys in the decryption sequence, decrypt a previous round text with a next round key in the decryption sequence to generate a next round text, wherein the last round text is the plaintext.

While the above specific description of some embodiments has been made in terms of a block cipher with a key schedule and defined by certain round key generators, it will be appreciated that the described embodiments of generating sequences of cryptographic keys may find wider application then in the context of a block cipher and round keys. The present disclosure is therefore not limited to the context of a block cipher but encompasses other uses of sub-key sequences generated from a main key in accordance with the disclosed embodiments of round key generators which can thus more generally be described as sub-key generators.

More generally, the above description of specific embodiments has been made by way of example to illustrate aspects of the disclosure in is not to be read as limiting on the subject matter claimed in the claims that follow.

The invention claimed is:

1. A method of generating, from a main key, sub-keys of a sequence of sub-keys for cryptographic operations, wherein each sub-key is defined by respective bit values, the method comprising:

operating on the main key with one or more one-way functions to generate a plurality of intermediate outputs;

applying a second set of one-way functions to the plurality of intermediate outputs to generate respective one-way outputs; and setting the respective bit values of the sub-keys of the sequence of sub-keys using respective bit values of the respective one-way outputs, wherein the plurality of intermediate values are generated from the main key only once.

2. The method as claimed in claim 1, further comprising:
generating an encrypted message using the respective bit values of the sub-keys of the sequence of sub-keys using respective bit values of the respective one-way outputs.

3. The method as claimed in claim 2; further comprising decrypting the encrypted message using the respective bit values of the sub-keys of the sequence of sub-keys using respective bit values of the respective one-way outputs.

4. A device for generating, from a main key, sub-keys of a sequence of sub-keys for cryptographic operations, wherein each sub-key is defined by respective bit values, the device comprising
a memory for storing the main key and at least one sub-key; and
a processor configured to:
operate on the main key with one or more one-way functions to generate a plurality of intermediate outputs;
apply a second set of one-way functions to the plurality of intermediate outputs to generate respective one-way outputs; and
set the respective bit values of the sub-keys of the sequence of sub-keys using respective bit values of the respective one-way functions outputs, wherein the plurality of intermediate values are generated from the main key only once.

5. The device as claimed in claim 4, wherein the processor is further configured to:
generate an encrypted message using the respective bit values of the sub-keys of the sequence of sub-keys using respective bit values of the respective one-way outputs.

6. A non-transitory computer-readable storage medium comprising instructions that, when executed by a processing device, cause the processing device to generate from a main key sub-keys of a sequence of sub-keys for cryptographic operations, wherein each sub-key is defined by respective bit values, the instructions configured to:
operate on the main key with one or more one-way functions to generate a plurality of intermediate outputs;
apply a second set of one-way functions to the plurality of intermediate outputs to generate respective one-way outputs; and
set the respective bit values of the sub-keys of the sequence of sub-keys using respective bit values of the respective one-way outputs, wherein the plurality of intermediate values are generated from the main key only once.

7. The non-transitory computer-readable storage medium as claimed in claim 6, wherein the instructions are further configured to:
generate an encrypted message using the respective bit values of the sub-keys of the sequence of sub-keys using respective bit values of the respective one-way outputs.

\* \* \* \* \*